United States Patent
Clevenger et al.

(10) Patent No.: US 11,154,061 B2
(45) Date of Patent: *Oct. 26, 2021

(54) FUNCTIONAL SURFACES

(71) Applicant: Orthobond Corporation, Princeton, NJ (US)

(72) Inventors: Randell Clevenger, North Plainfield, NJ (US); Jordan Katz, Short Hills, NJ (US)

(73) Assignee: ORTHOBOND CORPORATION, North Brunswick, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/785,789

(22) Filed: Oct. 17, 2017

(65) Prior Publication Data

US 2018/0103643 A1  Apr. 19, 2018

Related U.S. Application Data

(60) Provisional application No. 62/408,913, filed on Oct. 17, 2016.

(51) Int. Cl.
| | |
|---|---|
| *A01N 57/16* | (2006.01) |
| *C08F 220/36* | (2006.01) |
| *C09D 133/14* | (2006.01) |
| *C25D 11/26* | (2006.01) |
| *C09D 5/14* | (2006.01) |
| *A01N 43/40* | (2006.01) |
| *C09D 143/02* | (2006.01) |
| *C08F 230/02* | (2006.01) |
| *C25D 11/30* | (2006.01) |
| *C25D 11/34* | (2006.01) |

(52) U.S. Cl.
CPC ............ *A01N 57/16* (2013.01); *A01N 43/40* (2013.01); *C08F 220/36* (2013.01); *C08F 230/02* (2013.01); *C09D 5/14* (2013.01); *C09D 133/14* (2013.01); *C09D 143/02* (2013.01); *C25D 11/26* (2013.01); *C08F 2438/01* (2013.01); *C25D 11/30* (2013.01); *C25D 11/34* (2013.01)

(58) Field of Classification Search
CPC combination set(s) only.
See application file for complete search history.

(56) References Cited

U.S. PATENT DOCUMENTS

| | | | |
|---|---|---|---|
| 4,879,135 A | 11/1989 | Greco et al. | |
| 5,078,782 A | 1/1992 | Nielsen et al. | |
| 5,102,507 A | 4/1992 | Wieserman et al. | |
| 5,124,022 A | 6/1992 | Evans, II et al. | |
| 5,126,210 A | 6/1992 | Wieserman et al. | |
| 5,277,788 A | 1/1994 | Nitowski et al. | |
| 7,815,963 B2 * | 10/2010 | Schwartz | B05D 1/185 427/2.24 |
| 8,993,117 B2 * | 3/2015 | Schwartz | A61L 27/32 428/624 |
| 10,596,304 B2 * | 3/2020 | Clevenger | A61L 31/022 |
| 2003/0153061 A1 * | 8/2003 | Schuhmann | C12Q 1/002 435/190 |
| 2005/0027360 A1 | 2/2005 | Webb | |
| 2005/0147750 A1 | 7/2005 | Jacobs et al. | |
| 2006/0194008 A1 | 8/2006 | Schwartz et al. | |
| 2007/0077348 A1 | 4/2007 | Lu et al. | |
| 2007/0196663 A1 | 8/2007 | Schwartz et al. | |
| 2007/0292355 A1 | 12/2007 | Tamarkin et al. | |
| 2009/0232867 A1 | 9/2009 | Domb et al. | |
| 2010/0167072 A1 | 7/2010 | Chouai et al. | |
| 2010/0215643 A1 * | 8/2010 | Clevenger | A01N 25/10 514/1.1 |
| 2011/0223390 A1 * | 9/2011 | Hanawa | A61L 27/04 428/189 |
| 2014/0335142 A1 | 11/2014 | Frischherz et al. | |
| 2016/0115268 A1 | 4/2016 | Clevenger et al. | |

FOREIGN PATENT DOCUMENTS

| | | |
|---|---|---|
| WO | 200100034 | 1/2001 |
| WO | 2009052352 | 4/2009 |

OTHER PUBLICATIONS

Imazoto et al. "Incorporate of Antibacterial Monomer MDPB into Dentin Primer", J. Dent. Res. 76(3): 768-772, Mar. 1997 (Year: 1997).*
Park et al., "Antibacterial Activities of Polystyrene-Block-Poly (4-Vinyl Pyridine) and Poly (Styrene-Random-4-Vinyl Pyridine)" European Polymer Journal 40 (2004) 2318-2822, 5 pages.
Dennes et al., A Nanoscale Adhesion Layer to Promote Cell Attachment on Peek, Feb. 18, 2009, J. Am. Chem. Soc., vol. 131, pp.
Shard et al., "Surface Oxidation of Polyethylene, Polysthylene, Polystyrene, and PEEK: The Synthon Approach", 1992, Macrmolecules, vol. 25, pp. 2053-2054.
Notification of Transmittal of the International Search Report and the Written Opinion of the International Searching Authority, or the Declaration for PCT/US17/56885, dated Jan. 9, 2018, 10 pages.

* cited by examiner

*Primary Examiner* — Nicole M. Buie-Hatcher
(74) *Attorney, Agent, or Firm* — Venable LLP

(57) ABSTRACT

Articles having functional surfaces, for example antimicrobial functional surfaces, are prepared by methods comprising anodization. Organophosphorous compounds are deposited on a surface by methods comprising anodization, followed by attaching functional compounds, functional oligomers or functional polymers. Alternatively, functional organophosphorous compounds, functional oligomers or functional polymers are deposited on a surface by methods comprising anodization.

24 Claims, No Drawings

FUNCTIONAL SURFACES

The invention relates to articles having functional surfaces and methods of preparing the surfaces. In some embodiments, the functional surfaces are antimicrobial functional surfaces.

BACKGROUND

The need for control of infection is a vital concern for many, from public health officials, hospital and school administrators and the like, to private citizens. Typically, control of infection can be achieved by the topical application of disinfectants, antiseptics, antibacterials and the like to surfaces likely to be contacted by infectious agents. Common disinfectants only have a short-term effect and need to be reapplied constantly.

Antibiotics can be administered to stop infection in individuals. However, such administration is not always effective. Numerous medical applications, including orthopaedic, trauma, spine and general surgery applications, where the potential for infection is a serious concern, are not amenable to simple application of an antiseptic or treatment with antibiotics. For example, infection can be a devastating complication of a total joint arthroplasty (TJA). While some infections may be treated by antibiotic suppression alone, more aggressive therapies, such as two-stage re-implantation, are often required. TJA infections occur when bacteria colonize the surface of the implant. These species then form a resistant biofilm on the implant surface, which nullifies the body's normal antibody response.

External fixation devices provide temporary and necessary rigid constraints to facilitate bone healing. However, patients risk pin-tract infection at the site extending from the skin-pin interface to within the bone tissue. Such complications can result in sepsis and osteomyelitis, which could require sequestrectomy for correction. Even the most stringent pin-handling and post-procedure protocols have only a limited effect. Studies have shown that such protocols do not reduce the chance of infection.

In minimally-invasive spine fusions, pedicle screws are first implanted in the bone of the vertebrae, and then rods are fixed into the heads of the screws to immobilize and stabilize the affected segments. Screws and rods pass through the patient's skin into the spine space via a cannulated channel. As in external fixation, screws and rods are also prone to pin-tract infections; due to the implants' pathway through the skin, the chance of contacting and/or passing harmful bacteria is greatly increased.

Catheters and shunts are placed in any number of body cavities and vessels to facilitate the injection, drainage or exchange of fluids. Infections are common in catheter placements and are largely dependent on how long the patient is catheterized.

There is a need for anti-infective surfaces that may be employed in locations particularly susceptible to hosting infectious agents, such as public places, common areas of buildings, fixtures and the like. Moreover, there is a need for articles and materials with anti-infective surfaces, such as medical devices including implants, screws, rods, pins, catheters, stents, surgical tools and the like which could prevent infections by proactively killing bacteria that attempt to colonize the device surface both pre- and post-operatively.

SUMMARY

Disclosed in certain embodiments is a process for preparing an article having a functional surface, the process comprising depositing water soluble organophosphorous compounds on a surface of an article (e.g., a medical device) to form an organophosphorous layer and attaching one or more functional compounds or functional oligomers or polymers to the organophosphorous layer to form a functional layer, wherein the depositing of the organophosphorous compounds on the article surface comprises anodization.

Also disclosed in certain embodiments is a process for preparing an article having a functional surface, the process comprising depositing functional organophosphorous compounds or functional oligomers or polymers on a surface of an article (e.g., a medical device) to form a functional layer, wherein the depositing of the functional organophosphorous compounds, oligomers or polymers on the article surface comprises anodization.

Also disclosed in certain embodiments is an article (e.g., a medical device) that is prepared according to any of the processes disclosed herein.

Other embodiments of the disclosure are directed to methods of treating patients using the medical devices disclosed herein.

DETAILED DISCLOSURE

The functional layer comprises a water soluble organophosphorous layer attached to an article surface and functional compounds or functional oligomers or polymers attached (e.g., covalently bonded) to the organophosphorous layer. In certain embodiments, the functional layer comprises an oxide layer, an organophosphorous layer attached to the oxide layer through, e.g., phosphinate, phosphonate or phosphate moieties and functional compounds, functional oligomers or functional polymers attached (e.g., covalently bonded) to the organophosphorous layer through the organo groups.

The anodization process utilized in the present disclosure may form an oxide layer on a metal surface and/or may form an oxide layer on a native oxide layer as the organophosphorous compounds are deposited. The anodization process may also form an oxide layer on a synthetic oxide layer. Synthetic oxide layers include oxide, alkoxide and mixed oxide/alkoxide layers.

In some embodiments, the organo group may be a $C_2$-$C_{12}$ hydrocarbyl group, a $C_2$-$C_9$ hydrocarbyl group, or a $C_2$-$C_6$ hydrocarbyl group allowing the requirement of water solubility of the organophosphorous compound. Hydrocarbyl is any hydrocarbon containing group, for example straight or branched chain alkyl or alkenyl which may be interrupted by or substituted by one or more heteroatom-containing groups or aryl groups, for instance interrupted by one or more —O—, —NH— or —C(O)O— groups and/or substituted by one or more hydroxyl, carboxylic, amino, thiol, phosphonate or aryl groups. Aryl includes phenyl. Hydrocarbyl also includes aryl.

In certain embodiments, the present articles prepared by the anodization process of the disclosure comprise metal surfaces. Suitable metals include but are not limited to titanium, titanium alloys, stainless steel, cobalt chrome alloys, nickel, molybdenum, tantalum, zirconium, magnesium and alloys containing nickel, molybdenum, tantalum, zirconium, magnesium, mixtures thereof and alloys thereof.

Metals may have native oxide surfaces or may be imparted with a synthetic oxide surface. Synthetic oxide surfaces are for instance prepared by reacting a surface with a metal alkoxide as described in U.S. Pat. No. 6,645,644 and U.S. Pub. No. 2010/0215643, optionally followed by full or partial hydrolysis. Suitable metal oxides include tantalum ethoxide, titanium tetra-t-butoxide and zirconium tetra-t-butoxide. Present synthetic oxide surfaces include metal oxides, metal alkoxides and mixed metal oxide/alkoxides. In certain embodiments, the metal surfaces may be cleaned to remove or partially remove any oxide surface prior to anodization or alternatively, may be subject to the anodization process with a native or synthetic oxide surface.

Functional compounds, functional oligomers and functional polymers include but are not limited to one or more of anti-infective agents, antileukotrienes or leukotriene receptor antagonists, antihistamines, antiseptics, anti-inflammatory agents including steroidal anti-inflammatory agents and non-steroidal anti-inflammatory agents, decongestants, mucolytics, anticholinergics, mast cell stabilizers, anti-thrombotic agents, genetic active agents, proteins, amino acids, anabolics, analgesics, drugs and the like.

Of particular interest are functional anti-infective agents. Anti-infective agents include antimicrobial compounds, anti-fungals, antibiotics, non-antibiotic antimicrobials, anti-virals and antiseptics.

Antimicrobial agents that can be utilized in the present disclosure include but are not limited to antiamebics, arsthinol, bialamicol, carbarsone, cephaeline, chlorbetamide, chloroquine, chlorphenoxamide, chlortetracycline, dehydroemetine, dibromopropamidine, diloxanide, diphetarsone, emetine, fumagillin, glaucarubin, glycobiarsol, 8-hydroxy-7-iodo-5-quinoline-sulfonic acid, iodochlorhydroxyquin, iodoquinol, paromomycin, phanquinone, polybenzarsol, propamidine, quinfamide, scenidazole, sulfarside, teclozan, tetracycline, thiocarbamizine, thiocarbarsone, tinidazole; antibiotics, e.g. amino-glycosides (such as amikacin, apramycin, arbekacin, bambermycins, butirosin, dibekacin, dihydrostreptomycin, fortimicin(s), gentamicin, isepamicin, kaniamycin, micronomicin, neomycin, neomycin undecylenate, netilmicin, paromomycin, ribostamycin, sisomicin, spectinomycin, streptomycin, tobramycin, trospectomycin, and the like), amphenicols (such as azidamfenicol, chloramphenicol, florfenicol, thiamphenicol, and the like), ansamycins (such as rifamide, rifampin, rifamycin, rifapentine, rifaximin, and the like), β-lactams (e.g., carbacephems, loracarbef, carbapenems (such as biapenem, imipenem, meropenem, panipenem, and the like), cephalosporins (such as cefaclor, cefadroxil, cefamandole, cefatrizine, cefazedone, cefazolin, cefcapene povoxil, cefclidin, cefdinir, cefditoren, cefepime, cefetamet, cefixime, cefinenoxine, cefodizime, cefonicid, cefoperazone, ceforanide, cefotaxime, cefotiam, cefozopran, cefpimizole, cefpiramide, cefpirome, cefpodoxime proxetil, cefprozil, cefroxadine, cefsulodin, ceftazidime, cefteram, ceftezole, ceftibuten, ceftizoxime, ceftriaxone, cefuroxime, cefuzonam, cephacetrile sodium, cephalexin, cephaloglycin, cephaloridine, cephalosporin, cephalothin, cephapirin sodium, cephradine, pivcefalexin, and the like), cephamycins (such as cefbuperazone, cefmetazole, cefminox, cefotetan, cefoxitin, and the like), monobactams (such as aztreonam, carumonam, tigemonam, and the like), oxacephens (such as flomoxef, moxalactam, and the like), penicillins (such as amdinocillin, amdinocillin pivoxil, amoxicillin, ampicillin, apalcillin, aspoxicillin, azidocillin, azlocillin, bacampicillin, benzylpenicillic acid, benzylpenicillin sodium, carbenicillin, carindacillin, clometocillin, cloxacillin, cyclacillin, dicloxacillin, epicillin, fenbenicillin, floxacillin, hetacillin, lenampicillin, metampicillin, methicillin sodium, mezlocillin, naacillin sodium, oxacillin, penamecillin, penethamate hydriodide, penicillin G benethamine, penicillin G benzathine, penicillin G benzhydrylamine, penicillin G calcium, penicillin G hydrabamine, penicillin G potassium, penicillin G procaine, penicillin N, penicillin 0, penicillin V, penicllin V benzathine, penicillin V hydrabamine, penimepicycline, phenethicillin potassium, piperacillin, pivampicillin, propicillin, quinacillin, sulbenicillin, sultamicillin, talampicillin, temocillin, ticarcillin, and the like), ritipenem, lincosamides (such as clindamycin, lincomycin, and the like), macrolides (such as azithromycin, capbomycin, clarithromycin, dirithromycin, erythromycin, erythromycin acistrate, erythromycin estolate, erythromycin glucoheptonate, erythromycin lactobionate, erythromycin propionate, erythromycin stearate, Josamycin, leucomycins, midecamycins, miokamycin, oleandomycin, primycin, rokitamycin, rosaramicin, roxithromycin, spiramycin, troleandomycin, and the like), polypeptides (such as amphomycin, bacitracin, capreomycin, colistin, enduracidin, enviomycin, fusafungine, gramicidin s, gramicidin(s), mikamycin, polymyxin, pristinamycin, ristocetin, teicoplanin, thiostrepton, tuberactinomycin, tyrocidine, tyrothricin, vancomycin, viomycin, virginiamycin, zinc bacitracin, and the like), tetracyclines (such as apicycline, chlortetracycline, clomocycline, demeclocycline, doxycycline, guamecycline, lymecycline, meclocycline, methacycline, minocycline, oxytetracycline, penimepicycline, pipacycline, rolitetracycline, sancycline, tetracycline, and the like), cycloserine, mupirocin, tuberin; synthetic antibacterial agents, e.g. 2,4-diaminopyrimidines (such as brodimoprim, textroxoprim, trimethoprim, and the like), nitrofurans (such as furaltadone, furazolium chloride, nifuradene, nifuratel, nifurfoline, nifurpirinol, nifurprazine, nifurtoinol, nitrofirantoin, and the like), quinolones and analogs (such as cinoxacin, ciprofloxacin, clinafloxacin, difloxacin, enoxacin, fleroxacin, flumequine, grepafloxacin, lomefloxacin, miloxacin, nadifloxacin, nadilixic acid, norflaxacin, ofloxacin, oxolinic acid, pazufloxacin, pefloxacin, pipemidic acid, piromidic acid, rosoxacin, rufloxacin, sparfloxacin, temafloxacin, tosufloxacin, trovafloxacin, and the like), sulfonamides (such as acetyl sulfamethoxpyrazine, benzylsulfamide, chloramine-B, chloramine-T, dichloramine T, N2-formylsulfisomidine, N4-ÿ-d-glucosylsulfanilamide, mafenide, 4'-(methylsulfamoyl)sulfanilanilide, noprylsulfainide, phthalylsulfacetamide, phthalylsulfathiazole, salazosulfadimidine, succinylsulfathiazole, sulfabenzamide, sulfacetamide, sulfachlorpyridazine, sulfachrysoidine, sulfacytine, sulfadiazine, sulfadicramide, sulfadimethoxine, sulfadoxine, sulfaethidole, sulfaguanidine, sulfaguanol, sulfalene, sulfaloxic, sulfamerazine, sulfameter, sulfamethazine, sulfamethizole, sulfamethomidine, sulfamethoxazole, sulfamethoxypyridazine, sulfametrole, sulfamidochrysoidine, sulfamoxole, sulfanilamide, 4-sulfanilamidosalicylic acid, n4-sulfanilylsulfanilamide, sulfanilylurea, n-sulfanilyl-3,4-xylamide, sulfanitran, sulfaperine, sulfaphenazole, sulfaproxyline, sulfapyrazine, sulfapyridine, sulfasomizole, sulfasymazine, sulfathiazole, sulfathiourea, sulfatolamide, sulfisomidine, sulfisoxazole, and the like), sulfones (such as acedapsone, acediasulfone, acetosulfone sodium, dapsone, diathymosulfone, glucosulfone sodium, solasulfone, succisulfone, sulfanilic acid, p-sulfanilylbenzylamine, sulfoxone sodium, thiazolsulfone, and the like), clofoctol, hexedine, methenamine, methenamine anhydromethylenecitrate, methenamine hippurate, methenamine mandelate, methenamine sulfosalicylate, nitroxoline, taurolidine, xibomol, and the like; leprostatic antibacterial agents, such as acedapsone, acetosulfone sodium, clofazimine, dapsone, diathymosulfone, glucosulfone sodium, hydnocarpic acid, solasulfone, succisulfone, sulfoxone sodium, and the like, antifungal agents such as allylamines butenafine, naftifine, terbinafine, imidazoles (e.g., bifonazole, butoconazole, cholordantoin, chlormidazole, cloconazole, clotrimazole, econazole, enilconazole, fenticonazole, flutrimazole, isoconazole, Ketoconazole, lanoconazole, miconazole, omoconazole, oxiconazole nitrate, sertaconazole, sulconazole, tioconazole, and the like), thiocarbamates (e.g., tolcilate, tolindate, tolnaftate, and the like), triazoles (e.g., fluconazole, itraconazole, saperconazole, terconazole, and the like), acrisorcin, amorolfine, biphenamine, bromosalicylchloranilide, buclosamide, calcium propionate, chlorphenesin, ciclopirox, cloxyquin, coparaffinate, diamthazole dihydrochloride, exalamide, flucytosine, halethazole, hexetidine, loflucarban, nifuratel, potassium iodide, propionic acid, pyrithione, salicylanilide, sodium propionate, sulbentine, tenonitrozole, triacetin, ujothion, undecylenic acid, zinc propionate, etc.; or the like; analogs/derivatives thereof; salts thereof; or combinations thereof.

Other antimicrobial agents useful in the present invention include, but are not limited to, Q-lactamase inhibitors (e.g. clavulanic acid, sulbactam, tazobactam, and the like); chldramphenicols (e.g. azidamphenicol, chloramphenicol, thiaphenicol, and the like); fusidic acid; synthetic agents such as trimethoprim, (optionally in combination with sulfonamides) nitroimidazoles (e.g., metronidazole, tinidazole, nimorazole, and the like), and the like; antimycobacterial agents (e.g., capreomycin, clofazimine, dapsone, ethambutol, isoniazid, pyrazinamide, rifabutin, rifampicin, streptomycin, and the like); antiviral agents (e.g., acryclovir, amantadine, azidothymidine, ganciclovir, idoxuridine, tribavirin, trifluridine, vidarabine, and the like); interferons; antiseptic agents (e.g., chlorhexidine, gentian violet, octenidine, povidone iodine, quaternary ammonium compounds, silver sulfadiazine, triclosan, and the like); or the like; analogs/derivatives thereof; salts thereof; or combinations thereof.

Antimicrobial functional groups are also taught for instance in U.S. Pub. No. 2006/0194008.

Functional compounds, functional oligomers and functional polymers contain functional moieties, for instance antimicrobial compounds contain antimicrobial moieties. Antimicrobial moieties include for example chlorhexidine, ammonium salts, pyridinium salts and phosphonium salts.

Ammonium, pyridinium and phosphonium salts are hydrocarbyl-substituted at nitrogen or phosphorous. For example ammonium salts are quaternary alkyl ammonium salts where the alkyl groups are the same or different and are for example methyl, ethyl, propyl, butyl, hexyl, heptyl or octyl.

Anions paired with the ammonium, pyridinium and phosphonium cations include, for example, halides, $F^-$, $Cl^-$, $Br^-$ or $I^-$; anions of inorganic acids such as $PO_4^{3-}$, $HPO_3^{2-}$, $H_2PO_4^-$, $Na_2PO_4^-$, $HSO_4^-$, $KSO_4^-$, $NO_3^-$, etc.; anions of organic acids such as methanesulfonic acid, acetic acid, propionic acid, benzoic acid, phenol, p-toluenesulfonic acid, maleic acid, oxalic acid, citric acid, etc. Anions also include $AlF_6^{3-}$, $AsFe^-$, $BF_4^-$, $BiCl_4^{2-}$, $SiCl_3^{2-}$, $SbCl_6^{2-}$, $SbF_6^-$, $PF_6^-$, $GaCl_4^-$, $InF_4^-$, $TiF_6^{2-}$, $ZrF_6^-$, $FeI_4^-$, $SnCl_6^-$, etc.

Depositing organophosphorous compounds on a surface may comprise reacting phosphinic acid, phosphonic acid or phosphoric acid groups with an oxide layer on the surface. Such reaction results in the attachment (e.g., by covalent bonding) of phosphinate, phosphonate or phosphate moieties to the surface.

An article surface may be coated with a continuous oxide layer, i.e., a layer that is formed by a matrix of individual molecules that are chemically bonded and linked to each other, as opposed to individual molecules covering the surface. For example, metal alkoxide molecules may be bonded together on at least a portion of a surface to form a continuous layer.

An article surface may be coated with an oxide layer in a pattern or micropattern, for example via employing photoresist techniques. Thus, the functional layer may be applied in a pattern or micropattern.

The present functional layers are prepared via a process comprising anodization or electrochemical deposition of water soluble organophosphinic, organophosphonic or organophosphoric acids with an article. This results in the formation of an organophosphorous layer where the phosphinic, phosphonic or phosphoric acid moieties are attached to an oxide surface (via phosphinate, phosphonate or phosphate groups).

Anodization techniques that can be modified in view of the present disclosure are described for example in U.S. Pat. No. 5,126,210. For example, a metal article or metal surfaced article may optionally be cleaned with for example a mineral acid or a base to remove any surface oxides. The cleaned article may be placed in an aqueous solution or partially aqueous solution containing a suitable organophosphinic, organophosphonic or organophosphoric acid at a temperature e.g., of from about 5° C. to about 60° C. The metal surface is connected to the positive terminal of an electric power supply. A counter electrode is connected to the negative electrode of the power supply. The metal surface is then anodized at a voltage, e.g., of from about 1 to about 400 volts, for instance from about 30 to about 90 volts, depending on the desired thickness of the formed organophosphorous layer. Time periods may vary for example from about 1 second to about 60 seconds or more or from about 1 second to about 30 seconds or more.

Suitable water soluble organophosphorous compounds include organophosphinic, organophosphonic or organophosphoric acids containing as an organo group a $C_2$-$C_{12}$ hydrocarbyl group, a $C_2$-$C_9$ hydrocarbyl group, for example a $C_2$-$C_6$ hydrocarbyl group. Hydrocarbyl is any hydrocarbon containing group, for example straight or branched chain alkyl or alkenyl which may be interrupted by or substituted by one or more heteroatom-containing groups or aryl groups, for instance interrupted by one or more —O—, —NH— or —C(O)O— groups and/or substituted by one or more hydroxyl, carboxylic, amino, thiol, phosphonate or aryl groups. Aryl includes phenyl. $C_2$-$C_6$ includes $C_2$, $C_3$, $C_4$, $C_5$ and $C_6$.

Suitable organophosphorous compounds include for example hydroxyalkylphosphonic acid and mercaptoalkylphosphonic acid. Such suitable compounds provide a distal reactive group, in this case hydroxy or thiol. The reactive group may be used in a further reaction to incorporate a functional moiety, for instance an antimicrobial moiety. Such suitable compounds may be "ethoxylated" or "propoxylated", that is for example, reacting an organophosphorous compound where the organo group contains an amino, hydroxy or thiol substituent with ethylene oxide and/or propylene oxide may provide an organophosphorous compound containing repeating ethoxy or propoxy units and a distal reactive hydroxy group.

For example, an organophosphorous compound where the organo group contains an amino, hydroxy or thiol substituent may be reacted with a cross-coupling reagent such as (p-nitrophenyl) chloroformate, followed by reaction with a diamine or amino-alcohol. The free remaining distal amino group then may be quaternized to provide a quaternary ammonium moiety.

Diamines include 1,12-diaminododecane, 1,11-diaminoundecane, 1,10-diaminodecane, 1,8-diaminooctane, 1,9-diaminononane, 4,9-dioxa-1,12-dodecanediamine, hexamethylenediamine and the like. Aminoalcohols include ethanolamine and the like.

Therefore, "attaching" one or more functional compounds includes attaching a compound and further modifying the attached compound to provide the functional attached compound; and providing the functional layer.

The hydrocarbyl group containing one or more, for instance 1 to 3 nucleophilic substituents is also suitable for reacting with an atom transfer radical polymerization (ATRP) initiator, for example substituents selected from hydroxyl, amino and thiol.

In this case, an organophosphinic, organophosphonic or organophosphoric acid where the organo group contains a substituent suitable for reacting with an ATRP initiator is attached to an article surface. Suitable substituents of the organo group of organophosphorous compounds are in particular nucleophilic substituents.

In present ATRP processes, the organophosphinic, organophosphonic or organophosphoric acid compounds containing suitable substituents are attached to a surface via anodization processes as described above. The organophosphorous layer is then reacted with an ATRP initiator such as alpha-bromoisobutyryl bromide. This provides an initiator organophosphorous layer. In the case of a hydroxyl substituent, this results in formation of a —O(CO)C(CH$_3$)$_2$Br substituent on the organo group. Following this, ATRP is performed with unsaturated functional monomers in the presence of an ATRP catalyst.

In certain embodiments, the ATRP process provides articles having a surface having a functional layer disposed thereon, the functional layer comprising an organophosphorous layer and functional oligomers or polymers bonded to the organophosphorous layer.

In certain embodiments, the initiator layer may contain —(CO)C(CH$_3$)$_2$Br initiator substituents on a plurality of the organo groups, that is, on at least some of the organo groups. Examples of initiator substituents in the initiator layer include —O(CO)C(CH$_3$)$_2$Br, —NH(CO)C(CH$_3$)$_2$Br and —S(CO)C(CH$_3$)$_2$Br.

ATRP catalyst systems include for example CuBr and a polyamine ligand, such as pentamethyldiethylenetriamine, tris(2-pyridylmethyl)amine or tris[2-(dimethylamino)ethyl] amine.

Present functional layers prepared via ATRP may be characterized as containing functional oligomers or polymers containing a residual ATRP initiator moiety such as —O(CO)C(CH$_3$)$_2$—, —NH(CO)C(CH$_3$)$_2$— or —S(CO)C(CH$_3$)$_2$—.

Accordingly, disclosed in certain embodiments is an article having a functional surface, the article comprising a surface having a functional layer disposed thereon, the functional layer comprising an organophosphorous layer and functional oligomers or polymers bonded to the organophosphorous layer, where the functional oligomers or polymers contain a —O(CO)C(CH$_3$)$_2$—, —NH(CO)C(CH$_3$)$_2$— or a —S(CO)C(CH$_3$)$_2$— moiety.

In another embodiment, the anodization process may comprise depositing unsaturated organophosphorous compounds on an article surface to provide an unsaturated organophosphorous layer. The unsaturated organophosphorous layer may be reacted with one or more functional unsaturated monomers by methods comprising free-radical polymerization, anionic polymerization or cationic polymerization.

This process provides articles having a surface having a functional layer disposed thereon, the functional layer comprising an organophosphorous layer and functional oligomers or polymers bonded to the organophosphorous layer.

As used herein, the term unsaturated means ethylenically or propargylly unsaturated.

Functional oligomers and polymers contain functional monomer units. Monomer units are reacted or "polymerized" monomers. Antimicrobial functional monomers are described for instance in U.S. Pat. No. 6,355,704. Antimicrobial oligomers, polymers, monomers and monomer units contain antimicrobial moieties. Antimicrobial moieties include for example ammonium salts, pyridinium salts and phosphonium salts.

Present functional monomers contain for example ethylenic unsaturation. For instance, suitable antimicrobial monomers include but are not limited to (meth)acryloyloxydodecylpyridinium salts, (meth)acryloyloxyhexadecylpyridinium salts, (meth)acryloyloxydecyltriethylammonium salts, 4-hexadecyl(meth)acryloyloxyethylpyridinium salts, (meth)acryloyloxyethylhexadecylbipyridinium salts, (meth)acryloyloxydodecyltrimethylphosphonium salts, (meth)acryloyloxyoctadecyltriethylphosphonium salts, 4-(meth)acryloyloxy-ethyldodecylpyrldinium salts, di(4-vinylbenzyl)hexadecylmethylammonium salts, di((meth)acryloyloxyethyl)dodecylmethylammonium salts and (meth)acryloyloxyethyl(4-N-hexadecylpyridinylmethyl) succinate halides. The term "(meth)acryl" means acryl or methacryl.

For example, suitable antimicrobial monomers include but are not limited to methacryloyloxydodecylpyridinium bromide (MDPB), diallyldimethylammonium chloride (DADMAC), methacryloyloxyhexedecylpyridinium chloride (MHPC), 4-hexadecyhnethacryloyloxyethylpyridinium chloride (HMPC), methacryloyloxyethylhexadecylbipyridinium dichloride (MHBP), methacryloyloxyoctadecyltrimethylphosphonium chloride (DMPC), methacryloyloxyoctadecyltriethylphosphonium acetate (OEPA), 4-methacryloyloxyethyldodecylpyridinium chloride (MEDP), di(4-vinylbenzyl)hexadecylmethylammonium methylsulfate (VHMS), di(methacryloyloxyethyl)dodecylmethylammonium chloride (DDMC) and methacryloyloxyethyl(4-N-hexadecylpyridinylmethyl) succinate bromide (BMPS).

In certain embodiments, suitable organophosphinic, organophosphonic and organophosphoric acids contain organo groups having ethylenic or propargic unsaturation and may be referred to as organophosphorous unsaturated monomers.

Monomers having ethylenic unsaturation contain for example a vinyl group, allyl group, acrylic group or methacrylic group.

Suitable unsaturated organophosphorous monomers include organophosphinic, organophosphonic and organophosphoric acids such as vinyl phosphonic acid, allyl phosphonic acid, 2-methyl allylphosphonic acid, 2-butenyl phosphonic acid, allyl phosphate, ethyleneglycol methacrylatephosphate, dimethyl vinylphosphonate, diethyl allylphosphonate, bis(2-chloroethyl) vinylphosphonate, diethyl 3-butenylphosphonate, allyl phosphonic dichloride and allylphosphinic acid.

In certain embodiments, attachment of unsaturated organophosphinic, organophosphonic or organophosphoric acid monomer compounds to the article surface provides an organophosphorous layer having ethylenic or propargic unsaturation (an unsaturated organophosphorous layer).

In certain embodiments, the surface containing the unsaturated organophosphorous layer, where the organo group contains unsaturation, is reacted with unsaturated functional monomers for instance via a process comprising free-radical, anionic or cationic polymerization. Conditions and reagent levels are chosen to provide a desired level of oligomerization or polymerization.

Free-radical polymerization includes thermal techniques with the use of a free-radical initiator. Present polymerization methods also include photopolymerization. For example present methods comprise exposing a surface containing an unsaturated organophosphorous layer to a polymerizable functional monomer and ultraviolet (UV) and/or visible light. An article surface containing an unsaturated organophosphorous layer may be coated with a suitable polymerizable functional monomer followed by exposure to UV and/or visible light. A photoinitiator may be employed. Photoinitiators include acylphosphine oxides and alpha-hydroxyketones as described for instance in U.S. Pat. No. 6,284,813.

Non-functional monomers may also be employed in the present processes and articles, resulting in oligomers/polymers containing functional and non-functional monomers. Non-functional monomers include but are not limited to hydroxyalkyl acrylates or methacrylates, for example, methyl, ethyl, butyl, 2-ethylhexyl- or 2-hydroxyethyl acrylate, isobornyl acrylate or methyl or ethyl methacrylate. Silicone acrylates may also be included. Further examples are acrylonitrile, acrylamide, methacrylamide, N-substituted (meth)acrylamides, vinyl esters such as vinyl acetate, vinyl ethers such as isobutyl vinyl ether, styrene, alkyl- and halostyrenes, N-vinylpyrrolidone, vinyl chloride or vinylidene chloride. Also optionally included are monomers containing two or more double bonds such as diacrylates of ethylene glycol, propylene glycol, neopentyl glycol, hexamethylene glycol and of bisphenol-A, such as 4,4'-bis(2-acryloyloxyethoxy)diphenylpropane, trimethylolpropane triacrylate, pentaerythritol triacrylate or tetraacrylate, vinyl acrylate, divinyl benzene, divinyl succinate, diallyl phthalate, triallyl phosphate, triallyl isocyanurate and tris(2-acryloylethyl) isocyanurate.

In certain embodiments, the functional oligomers or polymers of the invention contain for example from 2 to about 50,000 or more functional monomer units, for instance from about 3, about 4, about 5, about 7, about 10, about 20, about 30, about 40, about 50 or about 60 to about 70, about 80, about 90, about 100, about 125, about 150, about 175, about 200, about 300, about 400, about 500, about 600, about 700, about 800, about 900, about 1000, about 2000, about 3000, about 5000 or about 10000 functional monomer units.

In other embodiments, the functional oligomers or polymers of the invention contain for example from any one of about 2, about 3, about 4, about 5, about 7, about 10, about 20, about 30, about 40, about 50 or about 60 to about 70, about 80, about 90, about 100, about 125, about 150, about 175, about 200, about 300, about 400, about 500, about 600, about 700, about 800, about 900, about 1,000 monomer units to any one of about 1,500, about 2,000, about 3,000, about 5,000, bout 10,000, about 25,000, about 40,000 or about 50,000 functional monomer units.

Organophosphorous layers of the invention may comprise a complete or partial mono-layer of organophosphorous monomers or compounds. Alternatively, they may comprise complete or partial multi-layers of the organophosphorous monomers or compounds, for instance from 1 to about 2, about 3, about 4, about 5, about 6, about 7, about 8, about 9 or about 10 complete or partial layers.

Alternatively, disclosed in certain embodiments is a process for preparing an article having a functional surface, the process comprising depositing functional organophosphorus compounds or functional oligomers or polymers on a surface of the article to form a functional layer, where depositing the functional organophosphorous compounds or oligomers or polymers on the article surface comprises anodization.

For example, compounds such as (6-hexylphosphonic acid)triethylammonium bromide may be obtained and deposited on an article surface by a process comprising anodization.

For example, an organophosphorous compound containing a suitable substituent on the organo group may be reacted with a functional compound to provide a functional organophosphorous compound. The functional organophosphorous compound is then deposited on an article surface by a process comprising anodization.

For example, an organophosphorous compound containing a suitable substituent on the organo group may be reacted with a compound to provide an intermediate organophosphorous compound. The intermediate organophosphorous compound may be deposited on an article surface by a process comprising anodization. The deposited intermediate compounds are then modified to provide functional compounds; providing a functional layer.

For example, an organophosphorous compound containing a suitable substituent on the organo group may be reacted with a compound to provide an intermediate organophosphorous compound. The intermediate organophosphorous compound may be further reacted to provide a functional organophosphorous compound, which is then deposited on an article surface by a process comprising anodization.

In certain embodiments, a functional oligomer or polymer may be prepared containing an organophosphorous moiety, which oligomer or polymer may be deposited on an article surface by a process comprising anodization. For example, 6-hydroxyhexyllphosphonic acid may be reacted with an ATRP initiator such as alpha-bromoisobutyryl bromide. This organophosphorous initiator compound may then be reacted under ATRP conditions with an unsaturated functional monomer such as MDPB. The functional polymer containing phosphonic acid groups is then deposited on an article surface by a process comprising anodization.

An example of this is to react 6-hydroxyhexylphosphonic acid with a cross-coupling agent such as (p-nitrophenyl) chloroformate, followed by reaction with a diamine or aminoalcohol to provide a free distal amino group. This compound may be quaternized to provide a quaternary ammonium moiety. The quaternary ammonium compound is then deposited on an article surface by a process comprising anodization. Provided is a functional antimicrobial quaternary ammonium layer.

Alternatively, the compound containing the free distal amino group may be deposited on an article surface by a process comprising anodization. The deposited compound may then be quaternized to provide a functional antimicrobial quaternary ammonium layer.

Present articles are for instance medical devices such as implantable or percutaneous medical devices. Medical devices include endoscopic, arthroscopic, laproscopic, cardiac, cardiovascular, vascular, non-woven mesh, woven mesh, foam, cloth, fabric, orthopedic, orthopedic trauma, spine, surgical, drainage catheter, shunt, tape, mesh, rope, cable, wire, suture, skin and tissue staple, burn sheet, external fixation and temporary/non-permanent implant devices.

In certain embodiments the article is a medical implant device or component thereof. Suitable medical implant devices and components thereof include, but not limited to, orthopedic prostheses for the hip, knee, ankle, shoulder, elbow, and spine. Exemplary medical implant devices include a full or partial knee arthroplasty prosthesis, full or partial hip arthroplasty prosthesis, full or partial elbow arthroplasty prosthesis, full or partial wrist arthroplasty prosthesis, full or partial shoulder arthroplasty prosthesis, full or partial ankle arthroplasty prosthesis, and full or partial articulating spinal segment arthroplasty prosthesis. Exemplary components of medical implant devices include a femoral component (e.g., for replacing one or more femoral condyles) or a tibial component (e.g., for replacing at least a portion of a proximal tibial plateau) of a knee prosthesis (e.g., a uni-compartmental or total knee arthroplasty prosthesis), a femoral component (e.g., for replacing at least the proximal portion or head of the femur) or an acetabular cup (e.g., for replacing the hip bone's femoral socket) of a hip prosthesis, a humeral component (e.g., for replacing the distal portion of the humerus) or an ulnar component (e.g., for replacing the proximal portion of the ulna) of an elbow prosthesis, a metacarpal component (for replacing at least a portion of one or more metacarpal bones) or radial component (for replacing the distal portion of the radius) of a wrist prosthesis, a humeral component (e.g., for replacing the proximal portion or head of the humerus) or glenoid component (e.g., for replacing the glenoid or socket portion of the scapula) of a shoulder prosthesis, a tibial component (e.g., for replacing the distal portion of the tibia) or talar component (e.g., for replacing the proximal portion of the talus) of an ankle prosthesis, and an endplate component (e.g., for contacting the superior or inferior portion of a cervical, lumbar or thoracic vertebra) or spacer component (e.g. for insertion between endplate components) of a vertebral disc prosthesis.

Present articles also include for example household articles such as cutting boards, sinks, utensils, counter tops, packaging, food storage containers, refrigerator parts, coolers and the like.

Present articles also include for example articles employed in hospital and/or nursing home environments such as walls, floors, bed-pans.

Following are some embodiments of the invention.

In a first embodiment, a process for preparing an article having a functional surface, the process comprising depositing organophosphorous compounds on a surface of the article to form an organophosphorous layer and attaching one or more functional compounds or functional oligomers or polymers to the organophosphorous layer to form a functional layer, wherein depositing the organophosphorous compounds on the article surface comprises anodization.

In a second embodiment, a process according to the first embodiment wherein the organophosphorous compounds comprise organophosphonic acids.

In a third embodiment, a process according to the first or second embodiments, wherein the organophosphorous compounds comprise organophosphinic acids. In a fourth embodiment, a process according to any of the preceding embodiments, wherein the organophosphorous compounds comprise organophosphoric acids.

In a fifth embodiment, a process according to any of the preceding embodiments, wherein the article comprises a surface comprising titanium, a titanium alloy, stainless steel, a cobalt chrome alloy, nickel, molybdenum, tantalum, zirconium, magnesium or an alloy containing one or more of nickel, molybdenum, tantalum, zirconium and magnesium.

In a sixth embodiment, a process according to any of the preceding embodiments, wherein the article comprises a surface comprising titanium.

In a seventh embodiment, a process according to any of the preceding embodiments, wherein the organo group is a $C_2$-$C_{12}$ or $C_2$-$C_9$ hydrocarbyl group. In an eighth embodiment, a process according to any of the preceding embodiments, wherein the organo group is a $C_2$-$C_6$ hydrocarbyl group. In a ninth embodiment, a process according to any of the preceding embodiments, wherein the functional compounds, functional oligomers or functional polymers comprise anti-infective compounds, for example antimicrobial compounds.

In a tenth embodiment, a process according to any of the preceding embodiments, wherein the functional compounds, functional oligomers or functional polymers comprise ammonium salts, pyridinium salts or phosphonium salts. In an eleventh embodiment, a process according to any of the preceding embodiments, wherein the organo groups are reacted with a diamine or an aminoalcohol to provide a distal amine which is subsequently quaternized to provide a functional layer containing quaternary ammonium compounds.

In a twelfth embodiment, a process according to the eleventh embodiment, wherein the organo groups contain an amino, hydroxy or thiol substituent which is reacted with a cross-coupling reagent followed by reaction with a diamine or aminoalcohol. In a thirteenth embodiment, a process according to any of the first through tenth embodiments comprising depositing unsaturated organophosphorous monomer compounds.

In a fourteenth embodiment, a process according to the thirteenth embodiment, wherein the unsaturated organophosphorous monomers are reacted with unsaturated functional monomers to form a functional layer comprising functional oligomers or polymers. In a fifteenth embodiment, a process according to the fourteenth embodiment comprising free-radical polymerization, anionic polymerization or cationic polymerization.

In a sixteenth embodiment, a process according to any of embodiments 13 to 15 where the unsaturated organophosphorous monomer compounds are selected from the group consisting of vinyl phosphonic acid, allyl phosphonic acid, 2-methyl allylphosphonic acid, 2-butenyl phosphonic acid, allyl phosphate and ethyleneglycol methacrylatephosphate.

In a seventeenth embodiment, a process according to any of the first through tenth embodiments comprising attaching functional oligomers or polymers to form an oligomeric or polymeric functional layer by a process comprising atom transfer radical polymerization (ATRP) of unsaturated functional monomers.

In an eighteenth embodiment, a process according to the seventeenth embodiment, wherein the organo group of the water soluble organophosphorous compounds is a $C_2$-$C_{40}$ or $C_2$-$C_{24}$ hydrocarbyl having 1 to 3 substituents selected from hydroxy, amino and thiol. In a nineteenth embodiment, a process according to any of embodiments 14-18 where the unsaturated functional monomers are antimicrobial monomers comprising ammonium salts, pyridinium salts or phosphonium salts.

In a twentieth embodiment, a process according to any of embodiments 14-19 where the unsaturated functional monomers are antimicrobial monomers selected from the group consisting of methacryloyloxydodecylpyridinium salts, diallyldimethylammonium chloride (DADMAC), methacryloyloxyhexadecylpyridinium salts, methacryloyloxydecyltriethylammonium salts, 4-hexadecylmethacryloyloxyethylpyridinium salts, methacryloyloxyethylhexadecylbipyridinium salts, methacryloyloxydodecyltrimethylphosphonium salts, methacryloyloxyoctadecyltriethylphosphonium salts, 4-methacryloyloxyethyldodecylpyrldinium salts, di(4-vinylbenzyl)hexadecylmethylammonium salts, di(methacryloyloxyethyl)dodecylmethylammonium salts and methacryloyloxyethyl(4-N-hexadecylpyridinylmethyl) succinate halides.

In a twenty first embodiment, a process according to any of embodiments 14-20 where the unsaturated functional monomers are antimicrobial monomers containing ammonium salts. In a twenty second embodiment, a process according to any of embodiments 14-21 where the unsaturated functional monomers comprise two or more different monomers. In a twenty third embodiment, a process according to any of embodiments 14-22 comprising also reacting non-functional unsaturated monomers.

In a twenty fourth embodiment, a process according to any of the preceding embodiments, wherein the functional layer is formed in a pattern or micropattern. In a twenty fifth embodiment, a process according to any of the preceding embodiments, wherein the organophosphorous layer is covalently bonded to an oxide layer through phosphinate, phosphonate or phosphate moieties.

In a twenty sixth embodiment, a process according to any of the preceding embodiments, comprising preparing an aqueous solution containing organophosphorous compounds, placing an article having a metal surface in the aqueous solution, connecting the metal surface to a positive terminal of an electric power supply and connecting a counter electrode to a negative electrode of the power supply.

In a twenty seventh embodiment, a process according to the twenty sixth embodiment, comprising applying a voltage of from about 1 to about 400 volts or from about 30 to about 90 volts for a time period of from about 1 sec to about 60 seconds or from about 1 second to about 30 seconds. In a twenty eighth embodiment, a process according to any of embodiments 1-26 where the article is selected from the group consisting of endoscopic, arthroscopic and laproscopic medical devices.

In a twenty ninth embodiment, a process according to any of embodiments 1-26 where the article is selected from the group consisting of cardiac, cardiovascular, vascular, orthopedic, orthopedic trauma and spine medical devices. In a thirtieth embodiment, a process according to any of embodiments 1-26 where the article is selected from the group consisting of catheters, shunts, tapes, meshes, ropes, cables, wires, sutures, skin or tissue staples, burn sheets, external fixation devices and temporary implants.

In a thirty first embodiment, a process for preparing an article having a functional surface, the process comprising depositing functional organophosphorous compounds or functional oligomers or polymers on a surface of the article to form a functional layer, wherein depositing the functional organophosphorous compounds, oligomers or polymers on the article surface comprises anodization.

In a thirty second embodiment, a process according to the thirty first embodiment, wherein the organophosphorous compounds comprise organophosphonic acids.

In a thirty third embodiment, a process according to embodiments 31 or 32 where the organophosphorous compounds comprise organophosphinic acids. In a thirty fourth embodiment, a process according to any of embodiments 31 to 33 wherein the organophosphorous compounds comprise organophosphoric acids. In a thirty fifth embodiment, a process according to any of embodiments 31-34 where the article comprises a surface comprising titanium, a titanium alloy, stainless steel, a cobalt chrome alloy, nickel, molybdenum, tantalum, zirconium, magnesium or an alloy containing one or more of nickel, molybdenum, tantalum, zirconium and magnesium.

In a thirty sixth embodiment, a process according to any of embodiments 31-35 where the article comprises a surface comprising titanium. In a thirty seventh embodiment, a process according to any of embodiments 31-36 where the organo group is a $C_2$-$C_{12}$ or $C_2$-$C_9$ hydrocarbyl group. In a thirty eighth embodiment, a process according to any of embodiments 31-37 where the organo group is a $C_2$-$C_6$ hydrocarbyl group.

In a thirty ninth embodiment, a process according to any of embodiments 31-38 where the functional compounds, functional oligomers or functional polymers comprise anti-infective compounds, for example antimicrobial compounds. In a fortieth embodiment, a process according to any of embodiments 31-39 wherein the functional compounds, functional oligomers or functional polymers comprise ammonium salts, pyridinium salts or phosphonium salts.

In a forty first embodiment, a process according to any of embodiments 31-40 wherein organophosphorous compounds are reacted with a diamine or an aminoalcohol to provide a distal amine which is subsequently quaternized to provide functional organophosphorous compounds containing quaternary ammonium moieties and depositing the functional organophosphorous compounds.

In a forty second embodiment, a process according to any of embodiments 31-40 where the organophosphorous compounds are reacted with a diamine or an aminoalcohol to provide an intermediate compound having a distal amine, depositing the intermediate compound on the surface and quaternizing the distal amine.

In a forty third embodiment, a process according to the forty first or forty second embodiments, wherein the organo groups contain an amino, hydroxy or thiol substituent which is reacted with a cross-coupling reagent followed by reaction with a diamine or aminoalcohol.

In a forty fourth embodiment, a process according to any of embodiments 31-40 comprising preparing a functional oligomer or polymer and depositing the oligomers or polymers on the surface. In a forty fifth embodiment, a process according to embodiment 44 where the functional oligomers or polymers are prepared by a process comprising atom transfer radical polymerization (ATRP) of unsaturated functional monomers.

In a forty sixth embodiment, a process according to embodiments 44 or 45 where an organophosphorous compound having one or more substituents suitable for reacting with an ATRP initiator on the organo group is reacted with an ATRP initiator.

In a forty seventh embodiment, a process according to the forty sixth embodiment, wherein the organo group of the organophosphorous compounds is a $C_2$-$C_{12}$ or $C_2$-$C_9$ hydrocarbyl having 1 to 3 substituents selected from hydroxy, amino and thiol.

In a forty eighth embodiment, a process according to any of embodiments 45-47, wherein the unsaturated functional monomers are antimicrobial monomers comprising ammonium salts, pyridinium salts or phosphonium salts.

In a forty ninth embodiment, a process according to any of embodiments 45-48, wherein the unsaturated functional monomers are antimicrobial monomers selected from the group consisting of methacryloyloxydodecylpyridinium salts, diallyldimethylammonium chloride (DADMAC), methacryloyloxyhexadecylpyridinium salts, methacryloyloxydecyltriethylammonium salts, 4-hexadecylmethacryloyloxyethylpyridinium salts, methacryloyloxyethylhexadecylbipyridinium salts, methacryloyloxydodecyltrimethylphosphonium salts, methacryloyloxyoctadecyltriethylphosphonium salts, 4-methacryloyloxyethyldodecylpyrldinium salts, di(4-vinylbenzyl)hexadecylmethylammonium salts, di(methacryloyloxyethyl)dodecylmethylammonium salts and methacryloyloxyethyl(4-N-hexadecylpyridinylmethyl) succinate halides.

In a fiftieth embodiment, a process according to any of embodiments 45-49, wherein the unsaturated functional monomers are antimicrobial monomers containing ammonium salts. In a fifty first embodiment, a process according to any of embodiments 45-50, wherein the unsaturated functional monomers comprise two or more different monomers.

In a fifty second embodiment, a process according to any of embodiments 45-51 comprising also reacting non-functional unsaturated monomers. In a fifty third embodiment, a process according to any of embodiments 31-52 where the functional layer is formed in a pattern or micropattern.

In a fifty fourth embodiment, a process according to any of embodiments 31-53, wherein the functional organophosphorous compounds, oligomers or polymers are covalently bonded to an oxide layer through phosphinate, phosphonate or phosphate moieties.

In a fifty fifth embodiment, a process according to any of embodiments 31-54 comprising preparing an aqueous solution containing functional organophosphorous compounds, oligomers or polymers, placing an article having a metal surface in the aqueous solution, connecting the metal surface to a positive terminal of an electric power supply and connecting a counter electrode to a negative electrode of the power supply.

In a fifty sixth embodiment, a process according to embodiment 55 comprising applying a voltage of from about 1 to about 400 volts or from about 30 to about 90 volts for a time period of from about 1 sec to about 60 seconds or from about 1 second to about 30 seconds.

In a fifty seventh embodiment, a process according to any of embodiments 31-56, wherein the article is selected from the group consisting of endoscopic, arthroscopic and laproscopic medical devices. In a fifty eighth embodiment, a process according to any of embodiments 31-57 where the article is selected from the group consisting of cardiac, cardiovascular, vascular, orthopedic, orthopedic trauma and spine medical devices.

In a fifty ninth embodiment, a process according to any of embodiments 31-57, wherein the article is selected from the group consisting of catheters, shunts, tapes, meshes, ropes, cables, wires, sutures, skin or tissue staples, burn sheets, external fixation devices and temporary implants.

In a sixtieth embodiment, an article having a functional surface, the article comprising a surface having a functional layer disposed thereon, the article prepared according to any of the preceding embodiments.

In a sixty first embodiment, an article having a functional surface, the article comprising a surface having a functional layer disposed thereon, the functional layer comprising an organophosphorous layer and functional oligomers or polymers bonded to the organophosphorous layer, where the functional oligomers or polymers contain a —O(CO)C(CH$_3$)$_2$—, —NH(CO)C(CH$_3$)$_2$— or a —S(CO)C(CH$_3$)$_2$— moiety.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±5%, ±4%, ±3%, ±2%, ±1%, ±0.5%, ±0.4%, ±0.3%, ±0.2%, ±0.1% or ±0.05%. All numeric values are modified by the term "about" whether or not explicitly indicated. Numeric values modified by the term "about" include the specific identified value. For example "about 5.0" includes 5.0.

Unless otherwise indicated, all parts and percentages are by weight.

All U.S. patent applications, published patent applications and patents referred to herein are hereby incorporated by reference.

EXAMPLES

Example 1

Attachment of Antimicrobial Functional Polymers by Free-Radical Polymerization

A clean metal titanium strip is placed in a 15 weight % aqueous solution of vinyl phosphonic acid. A titanium counter electrode is attached to the negative terminal of a DC power supply. The voltage is adjusted to between 1 and 300V and a titanium rod connected to the positive terminal of the power supply is contacted with the titanium strip for a period of from 1 to 30 seconds.

Anodization occurs, resulting in formation of a titanium oxide layer and vinyl phosphonic acid bonded to the oxide layer via phosphonate moieties. Ti—O—P fragments are observed via TOF-SIMS surface analysis. The titanium surface having an attached unsaturated organophosphorus layer is represented as below.

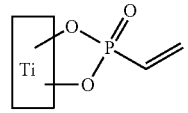

A solution of 12-methacryloyloxydodecylpyridinium bromide (MDPB) in ethanol (1 g/70 mL) is sprayed onto the titanium surface containing the vinylphosphonate layer (unsaturated organophosphorus layer). The titanium strips are placed in a nitrogen purged UV ozone cleaner chamber and exposed to UV light with a lambda max of ca. 260 nm with continuous purging for 15 minutes, resulting in polymerization of the vinyl groups with the methacrylate groups.

A titanium strip containing an antimicrobial layer is formed. The antimicrobial layer attached to a titanium surface contains an oxide layer, an organophosphorus layer and an antimicrobial polymer containing antimicrobial monomer units, as represented below, where * is a terminal end group.

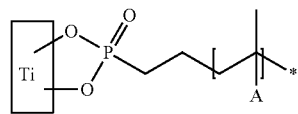

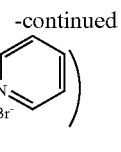

Example 2

Antimicrobial Efficacy

Titanium strips according to Example 1 and untreated samples are cut into 1×1 cm squares, sanitized with 70% alcohol and dried with argon. The sanitized samples are aseptically transferred individually into the wells of a sterile 24-well polystyrene dish. An overnight culture of MSSA 29213 is diluted in ASTM E2149 working buffer (0.3 mM $KH_2PO_4$, pH 7.2) to $OD_{600}$=0.005 (~1-4E+06 CFU/mL).

A 330 mL portion of the bacterial dilution is pipetted into each of the wells to cover the samples. A sample of the bacterial dilution is also serially diluted in 1× DPBS (Dulbecco's phosphate-buffered saline) and drop plated in triplicate on a TSA plate to ensure the bacterial challenge is on target. The TSA (tryptone soya agar) plates are incubated overnight at 37° C.

The polystyrene dish is placed into the 37° C. incubator at 500 RPM on a IKA MS3 digital shaker with a microtiter plate attachment overnight (18±2 hours). After the overnight incubation, the 24-well plate containing the sample buffer is removed from the incubator and the buffer samples are pipetted into a 96-well plate and serially diluted 1:10 in 1× DPBS. Each dilution is drop plated in triplicate for each sample on TSA plates. The plates are incubated overnight at 37° C. Against MSSA 21293, treated coupons show a reduction vs. control of 99.92% this assay.

The invention claimed is:

1. A process for preparing an article having a functional surface, the process comprising depositing organophosphorous compounds on a surface of an article to form an organophosphorous layer and attaching one or more functional compounds or functional oligomers or functional polymers to the organophosphorous layer to form a functional layer, wherein depositing the organophosphorous compounds on the article surface comprises aqueous anodization, wherein the organophosphorous compounds comprise organophosphonic acids, organophosphinic acids or organophosphoric acids, wherein the organo group is a $C_2$-$C_6$ hydrocarbyl group, and wherein the functional compounds, functional oligomers or functional polymers comprise quaternary alkyl ammonium salts, alkyl pyridinium salts or phosphonium salts, wherein the functional compounds or functional oligomers or functional polymers comprise one or more methacryloyloxydodecylpyridinium salts.

2. A process according to claim 1, wherein the article comprises a surface comprising titanium, a titanium alloy, stainless steel, a cobalt chrome alloy, nickel, molybdenum, tantalum, zirconium, magnesium or an alloy containing one or more of nickel, molybdenum, tantalum, zirconium and magnesium.

3. A process according to claim 1, wherein the article comprises a surface comprising titanium.

4. A process according to claim 1, wherein the organo groups are reacted with a diamine or an aminoalcohol to provide a distal amine which is subsequently quaternized to provide a functional layer containing quaternary ammonium compounds.

5. A process according to claim 1, comprising depositing unsaturated organophosphorous monomers, and wherein the unsaturated organophosphorous monomers are reacted with unsaturated functional monomers to form a functional layer comprising functional oligomers or polymers.

6. A process according to claim 5, wherein the unsaturated functional monomers are antimicrobial monomers comprising ammonium salts, pyridinium salts or phosphonium salts.

7. A process according to claim 5, wherein the unsaturated organophosphorous monomers include vinyl phosphonic acid, allyl phosphonic acid, 2-methyl allylphosphonic acid, 2-butenyl phosphonic acid, allyl phosphate and ethyleneglycol methacrylatephosphate.

8. A process according to claim 1, comprising attaching functional oligomers or polymers to form an oligomeric or polymeric functional layer by a process comprising atom transfer radical polymerization (ATRP) of unsaturated functional monomers.

9. A process according to claim 5 or 8, wherein the unsaturated functional monomers include antimicrobial monomers comprising diallyldimethylammonium chloride (DADMAC), methacryloyloxyhexadecylpyridinium salts, methacryloyloxydecyltriethylammonium salts, 4-hexadecylmethacryloyloxyethylpyridinium salts, methacryloyloxyethylhexadecylbipyridinium salts, methacryloyloxydodecyltrimethylphosphonium salts, methacryloyloxyoctadecyltriethylphosphonium salts, 4-methacryloyloxyethyldodecylpyrldinium salts, di(4-vinylbenzyl)hexadecylmethylammonium salts, di(methacryloyloxyethyl)dodecylmethylammonium salts and methacryloyloxyethyl(4-N-hexadecylpyridinylmethyl) succinate halides.

10. A process according to claim 1, wherein the organophosphorous layer is covalently bonded to an oxide layer through phosphinate, phosphonate or phosphate moieties.

11. A process according to claim 1, comprising preparing an aqueous solution containing organophosphorous compounds, placing an article having a metal surface in the aqueous solution, connecting the metal surface to a positive terminal of an electric power supply and connecting a counter electrode to a negative electrode of the power supply.

12. A process according to claim 11, comprising applying a voltage of from about 1 to about 400 volts for a time period of from about 1 sec to about 60 seconds.

13. A process according to claim 1, wherein the article is a medical device.

14. A process for preparing an article having a functional surface, the process comprising depositing functional organophosphorous compounds or functional oligomers or functional polymers on a surface of the article to form a functional layer, wherein the functional compounds, functional oligomers or functional polymers comprise quaternary alkyl ammonium salts, alkyl pyridinium salts or phosphonium salts, wherein depositing the functional organophosphorous compounds, oligomers or polymers on the article surface comprises deposition of unsaturated organophosphorus monomers by aqueous anodization and reaction of the unsaturated organophosphorus monomers with at least one of unsaturated functional monomers comprising methacryloyloxydodecylpyridinium salts, diallyldimethylammonium chloride (DADMAC), methacryloyloxyhexadecylpyridinium salts, methacryloyloxydecyltriethylammonium salts, 4-hexadecylmethacryloyloxyethylpyridinium salts, methacryloyloxyethylhexadecylbipyridinium salts, methacryloyloxydodecyltrimethylphosphonium salts, methacryloyloxyoctadecyltriethylphosphonium salts, 4-methacryloyloxyethyldodecylpyridinium salts, di(4-vinylbenzyl)hexadecylmethylammonium salts, di(methacryloyloxyethyl)dodecylmethylammonium salts and methacryloyloxyethyl(4-N-hexadecylpyridinylmethyl) succinate halides.

15. A process according to claim 14, wherein the organophosphorous compounds comprise organophosphonic acids, organophosphinic acids or organophosphoric acids.

16. A process according to claim 14, wherein the article comprises a surface comprising titanium, a titanium alloy, stainless steel, a cobalt chrome alloy, nickel, molybdenum, tantalum, zirconium, magnesium or an alloy containing one or more of nickel, molybdenum, tantalum, zirconium and magnesium.

17. A process according to claim 14, wherein the article comprises a surface comprising titanium.

18. A process according to claim 14, wherein the organo group is a $C_2$-$C_6$ hydrocarbyl group.

19. A process according to claim 14, wherein the functional organophosphorous compounds, oligomers or polymers are covalently bonded to an oxide layer through phosphinate, phosphonate or phosphate moieties.

20. A process according to claim 14, comprising preparing an aqueous solution containing functional organophosphorous compounds, oligomers or polymers, placing an article having a metal surface in the aqueous solution, connecting the metal surface to a positive terminal of an electric power supply and connecting a counter electrode to a negative electrode of the power supply.

21. A process according to claim 20 comprising applying a voltage of from about 1 to about 400 volts for a time period of from about 1 sec to about 60 seconds.

22. A process according to claim 14, wherein the article is a medical device.

23. An article having a functional surface, the article comprising a surface having a functional layer disposed thereon, the article prepared according to claim 14.

24. An article comprising a surface having a functional layer disposed thereon, wherein the functional layer comprises an organophosphorus layer attached to the article surface and one or more methacryloyloxydodecylpyridinium salts attached to the organophosphorous layer, the organophosphorus layer having been formed by a process comprising depositing organophosphorous compounds by aqueous anodization, wherein the organophosphorous compounds comprise organophosphonic acids, organophosphinic acids or organophosphoric acids, wherein the organo group is a $C_2$-$C_6$ hydrocarbyl group.

* * * * *